(12) United States Patent
Kim

(10) Patent No.: US 9,393,927 B2
(45) Date of Patent: Jul. 19, 2016

(54) AIRBAG APPARATUS

(71) Applicant: HYUNDAI MOBIS Co., Ltd., Yongin-si, Gyeonggi-do (KR)

(72) Inventor: Jae Hyun Kim, Yongin-si (KR)

(73) Assignee: HYUNDAI MOBIS CO., LTD., Yongin-si, Gyeonggi-do (KR)

( * ) Notice: Subject to any disclaimer, the term of this patent is extended or adjusted under 35 U.S.C. 154(b) by 0 days.

(21) Appl. No.: 14/806,743

(22) Filed: Jul. 23, 2015

(65) Prior Publication Data

US 2016/0046258 A1 Feb. 18, 2016

(30) Foreign Application Priority Data

Aug. 14, 2014 (KR) .................. 10-2014-0106193

(51) Int. Cl.
*B60R 21/239* (2006.01)
*B60R 21/2338* (2011.01)

(52) U.S. Cl.
CPC ....... *B60R 21/239* (2013.01); *B60R 2021/2395* (2013.01); *B60R 2021/23382* (2013.01)

(58) Field of Classification Search
CPC .................. B60R 21/239; B60R 21/2395
See application file for complete search history.

(56) References Cited

U.S. PATENT DOCUMENTS

| | | | | |
|---|---|---|---|---|
| 8,297,651 B2 * | 10/2012 | Kwon | ................. | B60R 21/0134 180/274 |
| 8,746,736 B2 * | 6/2014 | Mendez | ................. | B60R 21/239 280/736 |
| 9,150,189 B1 * | 10/2015 | Nelson | ................. | B60R 21/2338 |
| 9,216,712 B1 * | 12/2015 | Kwon | ................. | B60R 21/2338 |
| 2007/0040366 A1 * | 2/2007 | Maidel | ................. | B60R 21/239 280/739 |
| 2010/0225095 A1 * | 9/2010 | Smith | ................. | B60R 21/2338 280/729 |
| 2011/0031725 A1 * | 2/2011 | Rose | ................. | B60R 21/2338 280/736 |
| 2011/0133437 A1 * | 6/2011 | Jang | ................. | B60R 21/2338 280/743.2 |
| 2011/0309605 A1 * | 12/2011 | Kumagai | ................. | B60R 21/2338 280/741 |
| 2015/0130173 A1 * | 5/2015 | Biller | ................. | B60R 21/04 280/736 |
| 2015/0283971 A1 * | 10/2015 | Fischer | ................. | B60R 21/2338 280/742 |
| 2015/0375711 A1 * | 12/2015 | Umehara | ................. | B60R 21/239 280/740 |
| 2016/0031408 A1 * | 2/2016 | Ko | ................. | B60R 21/239 280/729 |

FOREIGN PATENT DOCUMENTS

DE 102014011013 A1 * 12/2014 ............. B60R 21/38
JP 4799989 B2 * 10/2011

* cited by examiner

*Primary Examiner* — James English
(74) *Attorney, Agent, or Firm* — Paratus Law Group, PLLC

(57) ABSTRACT

Provided is an airbag apparatus capable of adjusting deployment pressure of an airbag. To this end, an airbag apparatus according to an exemplary embodiment of the present invention includes: an airbag which is inflated when gas flows into the airbag, and has a vent hole through which the gas flowing into the airbag is discharged; a vent cover which is disposed outside the airbag; and a tether which penetrates the vent hole and pulls the vent cover while being tightened as the airbag is inflated so that the vent cover shields the vent hole.

11 Claims, 3 Drawing Sheets ical Field

AIRBAG APPARATUS

CROSS-REFERENCE TO RELATED APPLICATIONS

The present application claims priority to Korean Patent Application Number 10-2014-0106193 filed Aug. 14, 2014, the entire contents of which the application is incorporated herein for all purposes by this reference.

TECHNICAL FIELD

The present invention relates to an airbag apparatus, and more particularly, to an airbag apparatus which is installed in front of a front passenger seat.

BACKGROUND

In general, various occupants such as infants, children, and females having a smaller body size than the typical body size as well as adult persons having the typical body size are seated in a front passenger seat.

Therefore, a vent rate adjusting member, which is used to adjust an amount of gas discharged from an airbag to change deployment pressure of the airbag depending on the type of passenger, is installed in a passenger airbag.

The vent rate adjusting member is broadly classified into a low risk deployment (LRD) vent and an active vent.

The LRD vent is installed for the purpose of discharging gas when the airbag is initially inflated, so as to reduce initial deployment pressure of the airbag, and blocking discharge of gas after the airbag is fully inflated, so as to allow the airbag to maintain appropriate deployment pressure, thereby preventing a neck of an infant from being injured due to excessive deployment pressure of the airbag when the airbag is initially deployed.

On the contrary to the LRD vent, the active vent is installed for the purpose of blocking discharge of gas when the airbag is initially deployed, so as to allow the airbag to be quickly deployed, and discharging gas after the airbag is fully deployed, so as to allow the airbag to maintain appropriate deployment pressure, thereby protecting an adult person by maintaining appropriate pressure at an appropriate point of time.

SUMMARY

The present invention has been made in an effort to provide an airbag apparatus capable of adjusting deployment pressure of an airbag.

Technical problems of the present invention are not limited to the aforementioned technical problem, and other technical problems, which are not mentioned above, may be clearly understood by those skilled in the art from the following descriptions.

An exemplary embodiment of the present invention provides an airbag apparatus including: an airbag which is inflated when gas flows into the airbag, and has a vent hole through which the gas flowing into the airbag is discharged; a vent cover which is disposed outside the airbag; and a tether which penetrates the vent hole and pulls the vent cover while being tightened as the airbag is inflated so that the vent cover shields the vent hole.

Other detailed matters of the exemplary embodiment are included in the detailed description and the drawings.

According to the airbag apparatus according to the exemplary embodiment of the present invention, since the vent cover opens the vent hole when the airbag is initially inflated, it is possible to prevent an infant from being injured due to initial deployment pressure of the airbag when the infant is seated in the seat.

In addition, since the vent cover shields the vent hole when the airbag is fully inflated, the airbag may maintain appropriate deployment pressure by which an adult person may be protected when the adult person is seated in the seat.

The effect of the present invention is not limited to the aforementioned effect, and other effects, which are not mentioned above, will be clearly understood by those skilled in the art from the claims.

DETAILED DESCRIPTION

Figure 1:
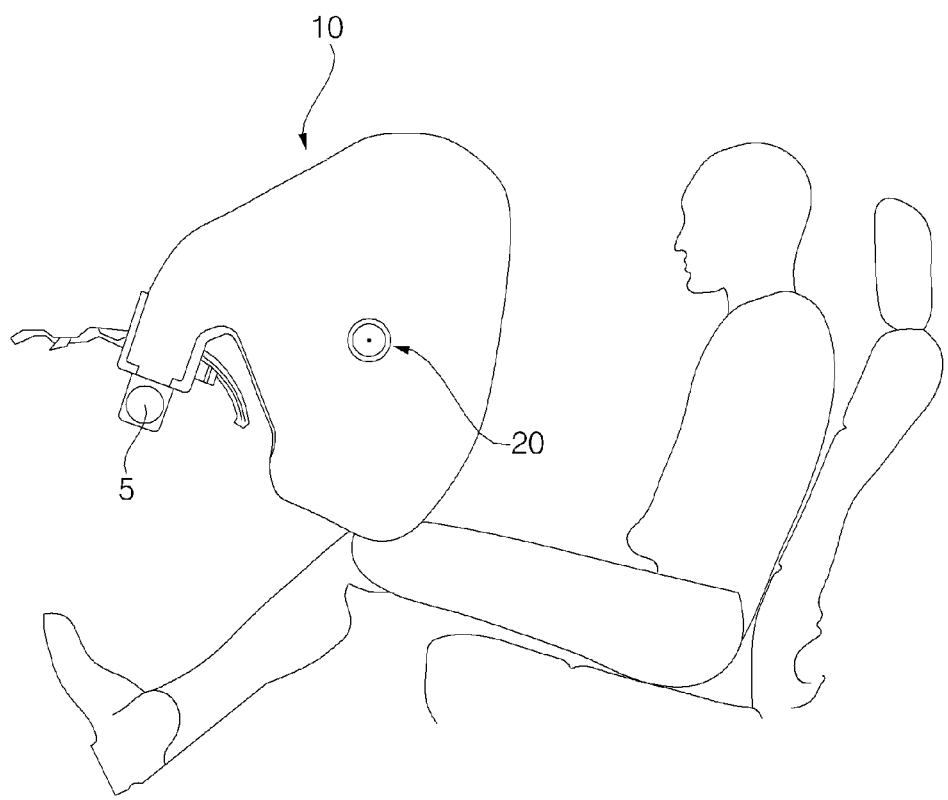
FIG. 1 is a side view illustrating a state in which an airbag of an airbag apparatus according to an exemplary embodiment of the present invention is fully inflated.

Advantages and features of the present invention and methods of achieving the advantages and features will be clear with reference to exemplary embodiments described in detail below together with the accompanying drawings. However, the present invention is not limited to the exemplary embodiments set forth below, and may be embodied in various other forms. The present exemplary embodiments are for rendering the disclosure of the present invention complete and are set forth to provide a complete understanding of the scope of the invention to a person with ordinary skill in the technical field to which the present invention pertains, and the present invention will only be defined by the scope of the claims. Like reference numerals indicate like elements throughout the specification.

Hereinafter, an airbag apparatus according to an exemplary embodiment of the present invention will be described with reference to the drawings.

Figure 2:
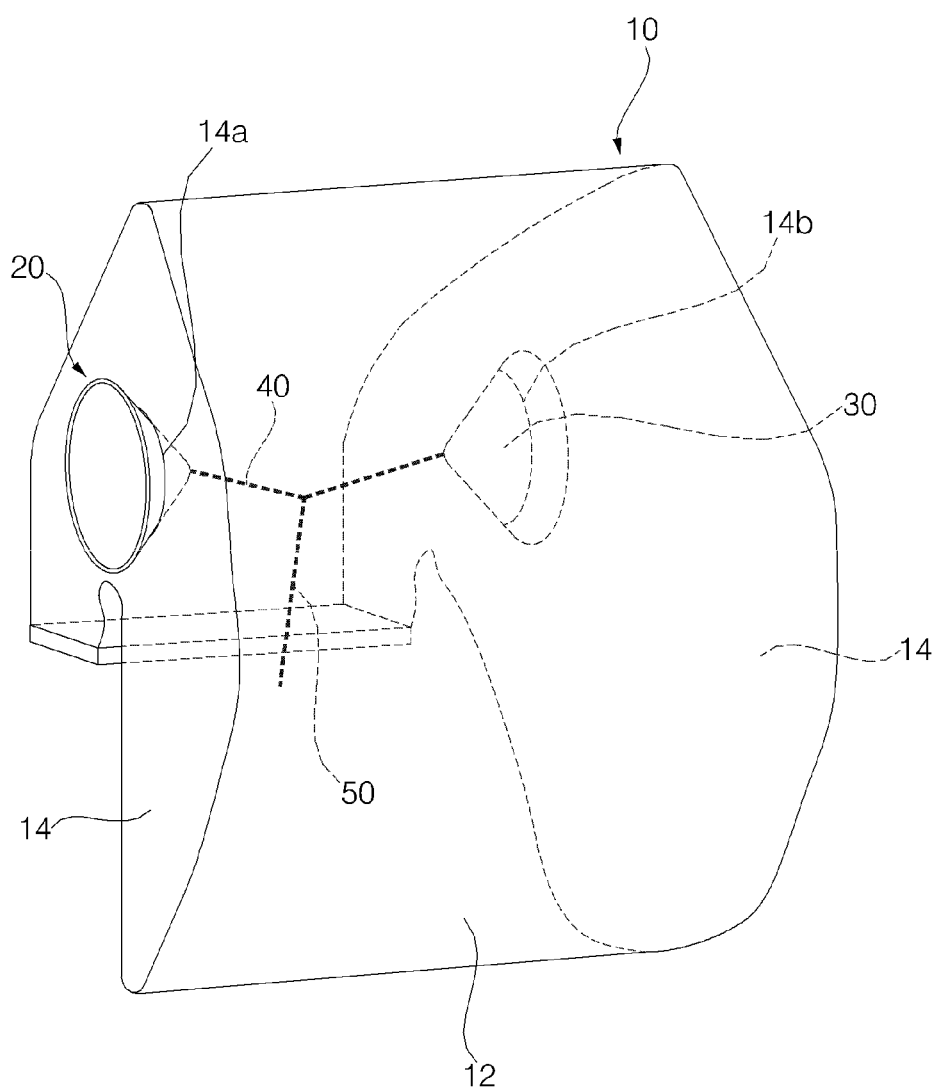
FIG. 2 is a perspective view illustrating a state in which the airbag of the airbag apparatus according to the exemplary embodiment of the present invention is fully inflated.
Figure 3:
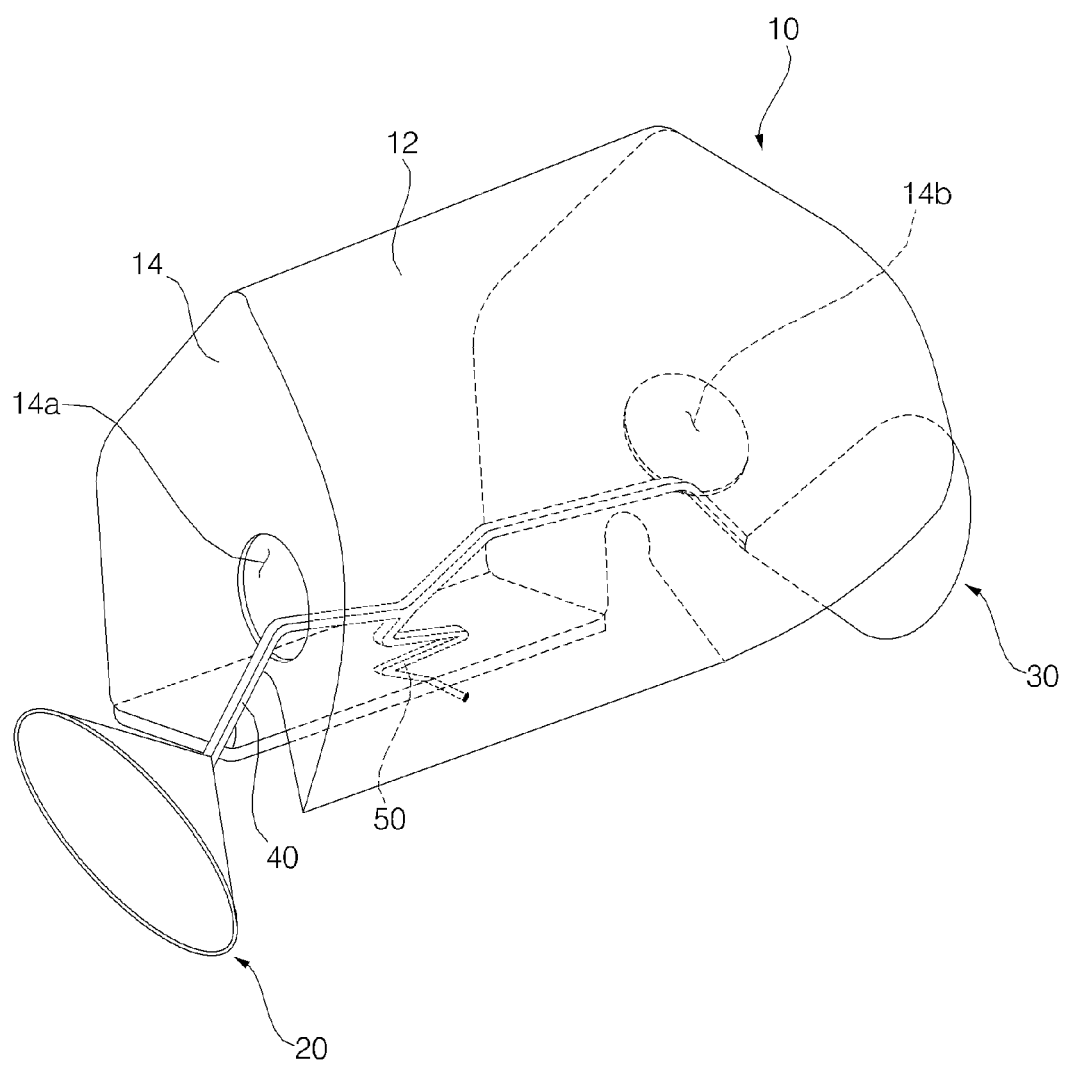
FIG. 3 is a perspective view illustrating a state in which the airbag of the airbag apparatus according to the exemplary embodiment of the present invention is initially inflated.

Referring to FIGS. 1 to 3, an airbag apparatus according to an exemplary embodiment of the present invention includes an inflator 5 which generates gas, and an airbag 10 which is inflated when the gas generated by the inflator 5 flows into the airbag 10 to protect a passenger using cushioning force.

The inflator 5 is controlled by a control signal from a controller and generates gas at the time of a vehicle accident. The interior of the inflator 5 is filled with a gas generating medium that generates gas while exploding by the control signal from the controller.

The inflator 5 may be coupled to an airbag housing and supported by the airbag housing. The airbag 10 is folded and then accommodated in the airbag housing, and a rear end portion of the airbag 10 is connected with the inflator 5 so that the gas generated by the inflator 5 may flow into the airbag 10. The airbag housing is coupled to the inflator 5 and the airbag 10 and mounted to a vehicle body.

Circular vent holes 14a and 14b through which gas flowing into the airbag 10 is discharged are formed in lateral surfaces of the airbag 10. The vent holes 14a and 14b are formed in both lateral surfaces of the airbag 10. That is, the vent holes 14a and 14b include a first vent hole 14a formed in one surface of the airbag 10, and a second vent hole 14b formed in the other surface of the airbag 10.

Vent covers 20 and 30, which serve to shield the vent holes 14a and 14b while being pulled by a tether 40 as the airbag 10 is inflated, are disposed outside the airbag 10. In the present exemplary embodiment, since the vent holes 14a and 14b include the first vent hole 14a and the second vent hole 14b, the vent covers 20 and 30 also include a first vent cover 20 which serves to shield the first vent hole 14a while being pulled by the tether 40 as the airbag 10 is inflated, and a second vent cover 30 which serves to shield the second vent hole 14b while being pulled by the tether 40 as the airbag 10 is inflated.

Since the vent holes 14a and 14b are formed in a circular shape, the vent covers 20 and 30 are formed in a conical shape. The vent covers 20 and 30 may be made of a hard material that is not bent. For example, the vent covers 20 and 30 may be made of plastic. The shape of the vent covers 20 and 30 may be variously changed corresponding to the shape of the vent holes 14a and 14b. That is, tips of the vent covers 20 and 30, which are inserted into the vent holes 14a and 14b, are smaller in size than the vent holes 14a and 14b, the size of each of the vent covers 20 and 30 is gradually increased toward a rear end of each of the vent covers 20 and 30, and the rear ends of the vent covers 20 and 30 are larger in size than the vent holes 14a and 14b.

The airbag 10 is made of a flexible material that may be inflated. The airbag 10 is manufactured by coupling three panels by sewing. That is, the airbag 10 includes a main panel 12 which is disposed at a center of the airbag 10, and side panels 14 which are coupled to both lateral surfaces of the main panel 12. The circumferences of the side panels 14 are coupled to both sides of the main panel 12 by sewing, and as a result, the airbag 10 is completely manufactured.

The first vent hole 14a is formed in any one side panel of either of the side panels 14, and the second vent hole 14b is formed in the other side panel of both of the side panels 14.

When the airbag 10 is inflated, the vent covers 20 and 30 shield the vent holes 14a and 14b by being pulled by the tether 40. When the vent covers 20 and 30 are pulled by the tether 40, the tips of the vent covers 20 and 30 may be inserted into the vent holes 14a and 14b and disposed in the airbag 10.

Similar to the airbag 10, the tether 40 is made of a flexible material. The tether 40 is formed to have a length that may allow the tether 40 to be in a loosened state when the airbag 10 is initially inflated, and may allow the tether 40 to become gradually tightened and pull the vent covers 20 and 30 as the airbag 10 is inflated such that when the airbag 10 is fully inflated, the vent covers 20 and 30 may completely shield the vent holes 14a and 14b.

In the present exemplary embodiment, the tether 40 penetrates the first vent hole 14a and the second vent hole 14b, such that one end of the tether 40 is coupled to the tip of the first vent cover 20, and the other end of the tether 40 is coupled to the tip of the second vent cover 30. If a single vent hole 14a or 14b is formed and a single vent cover 20 or 30 is provided, the tether 40 penetrates the vent hole 14a or 14b, such that one end of the tether 40 may be coupled to the tip of the vent cover 20 or 30, and the other end of the tether 40 may be coupled to the airbag 10 inside the airbag 10.

Further, even though the vent holes 14a and 14b include the first vent hole 14a and the second vent hole 14b and the vent covers 20 and 30 include the first vent cover 20 and the second vent cover 30 as described in the present exemplary embodiment, the number of tethers 40 need not be limited to one. For example, two tethers 40 may be provided, and one tether may penetrate the first vent hole 14a and have one end coupled to the tip of the first vent cover 20 and the other end coupled to the airbag 10 inside the airbag 10, and the other tether may penetrate the second vent hole 14b and have one end coupled to the tip of the second vent cover 30 and the other end coupled to the airbag 10 inside the airbag 10.

The present exemplary embodiment further includes a strap 50 which has one end coupled between both ends of the tether 40, and the other end coupled to a lower surface of the airbag 10. The strap 50 may be made of the same material as the tether 40. The strap 50 may be formed to have a length that may allow the strap 50 to be in a loosened state when the airbag 10 is initially inflated and may allow the strap 50 to become gradually tightened as the airbag 10 is inflated so as to pull the tether 40. In the present exemplary embodiment, the strap 50 is coupled to a central portion between both ends of the tether 40.

An operation of the airbag apparatus according to the exemplary embodiment of the present invention, which is configured as described above, will be described below.

First, at the time of a vehicle accident, the inflator 5 generates gas, and the gas generated by the inflator 5 flows into the airbag 10. The airbag 10 begins to be inflated by gas flowing into the airbag 10. As described above, when the airbag 10 is initially inflated, the first vent cover 20 and the second vent cover 30 are disposed outside the airbag 10 as illustrated in FIG. 3. Therefore, when the airbag 10 is initially inflated, the first vent hole 14a and the second vent hole 14b are opened.

As described above, since the first vent hole 14a and the second vent hole 14b are opened when the airbag 10 is initially inflated, the gas in the airbag 10 is discharged to the outside of the airbag 10 through the first vent hole 14a and the second vent hole 14b, and as a result, when an infant is seated in the seat, the infant is not injured due to initial deployment pressure of the airbag 10.

Thereafter, the tether 40 and the strap 50 begin to be gradually tightened while moving as the airbag 10 is inflated, while the airbag 10 is being inflated. When the tether 40 and the strap 50 are tightened, the tether 40 pulls the first vent cover 20 and the second vent cover 30. Therefore, the first vent cover 20 is pulled by the tether 40 such that the tip of the first vent cover 20 is inserted into the airbag 10 through the first vent hole 14a and shields a part of the first vent hole 14a, and the second vent cover 30 is pulled by the tether 40 such that the tip of the second vent cover 30 is inserted into the airbag 10 through the second vent hole 14b and shields a part of the second vent hole 14b.

Thereafter, when the airbag 10 is fully inflated, the first vent cover 20 is pulled by the tether 40 and completely shields the first vent hole 14a, and the second vent cover 30 is pulled by the tether 40 and completely shields the second vent hole 14b. Therefore, the gas flowing into the airbag 10 is not discharged any more through the first vent hole 14a and the second vent hole 14b, and as a result, the airbag 10 maintains deployment pressure.

Since the airbag 10 maintains deployment pressure when the airbag 10 is fully inflated as described above, the airbag 10 may protect an adult person using appropriate deployment pressure when the adult person is seated in the seat.

As described above, according to the airbag apparatus according to the exemplary embodiment of the present invention, since the vent covers 20 and 30 open the vent holes 14a and 14b when the airbag 10 is initially inflated, it is possible to prevent an infant from being injured due to initial deployment pressure of the airbag 10 when the infant is seated in the seat.

In addition, since the vent covers 20 and 30 shield the vent holes 14a and 14b when the airbag 10 is fully inflated, the airbag 10 may maintain appropriate deployment pressure by which an adult person may be protected when the adult person is seated in the seat.

It may be understood by a person skilled in the art that the present invention may be carried out in other specific forms without changing the technical spirit or the essential characteristics. Thus, it should be appreciated that the exemplary embodiments described above are intended to be illustrative in every sense, and not restrictive. The scope of the present invention is represented by the claims to be described below rather than the detailed description, and it should be interpreted that all the changes or modified forms, which are derived from the meaning and the scope of the claims, and the equivalents thereto, are included in the scope of the present invention.

What is claimed is:

1. An airbag apparatus comprising:
    an airbag which is inflated when gas flows into the airbag, and has a vent hole through which the gas flowing into the airbag is discharged;
    a vent cover which is disposed outside the airbag and which is formed as a separate body detached from the airbag and made of a hard material which is not flexible; and
    a tether which penetrates the vent hole and pulls the vent cover while being tightened as the airbag is inflated so that the vent cover shields the vent hole.

2. The airbag apparatus of claim 1, wherein the number of vent holes is more than one, the vent holes include a first vent hole formed in one surface of the airbag and a second vent hole formed in other surface of the airbag which is opposite to the one surface of the airbag, the number of vent covers is more than one, and the vent covers include a first vent cover which shields the first vent hole by being pulled by the tether, and a second vent cover which shields the second vent hole by being pulled by the tether.

3. The airbag apparatus of claim 2, wherein the tether has one end coupled to the first vent cover, and other end coupled to the second vent cover.

4. The airbag apparatus of claim 3, further comprising:
    a strap which has one end coupled between both ends of the tether, and other end coupled to the airbag.

5. The airbag apparatus of claim 4, wherein the one end of the strap is coupled to a central portion between both ends of the tether.

6. The airbag apparatus of claim 1, wherein the tether has one end coupled to the vent cover and other end coupled to the airbag.

7. The airbag apparatus of claim 1, wherein when the vent cover is pulled by the tether, a tip of the vent cover is inserted into the airbag through the vent hole.

8. The airbag apparatus of claim 7, wherein the tip of the vent cover is smaller in size than the vent hole, the size of the vent cover is gradually increased toward a rear end of the vent cover, and the rear end of the vent cover is larger in size than the vent hole.

9. The airbag apparatus of claim 1, wherein the vent hole is opened when the airbag is initially inflated, the vent cover shields a part of the vent hole while the airbag is being inflated, and the vent cover completely shields the vent hole when the airbag is fully inflated.

10. The airbag apparatus of claim 1, wherein the vent cover is made of plastic resin.

11. The airbag apparatus of claim 1, wherein the vent cover is formed in a conical shape which has a base circumference greater than the vent hole in size.

\* \* \* \* \*